US009505653B2

(12) United States Patent
Bookbinder et al.

(10) Patent No.: US 9,505,653 B2
(45) Date of Patent: *Nov. 29, 2016

(54) ACID STRENGTHENING OF GLASS

(71) Applicant: CORNING INCORPORATED, Corning, NY (US)

(72) Inventors: Dana Craig Bookbinder, Corning, NY (US); Richard Michael Fiacco, Corning, NY (US); Timothy Michael Gross, Corning, NY (US)

(73) Assignee: Corning Incorporated, Corning, NY (US)

( * ) Notice: Subject to any disclaimer, the term of this patent is extended or adjusted under 35 U.S.C. 154(b) by 52 days.

This patent is subject to a terminal disclaimer.

(21) Appl. No.: 14/585,605

(22) Filed: Dec. 30, 2014

(65) Prior Publication Data
US 2015/0107303 A1    Apr. 23, 2015

Related U.S. Application Data

(63) Continuation of application No. 13/673,255, filed on Nov. 9, 2012, now Pat. No. 8,978,414.

(60) Provisional application No. 61/558,105, filed on Nov. 10, 2011.

(51) Int. Cl.
*C03C 15/00* (2006.01)
*C03C 21/00* (2006.01)

(52) U.S. Cl.
CPC ............ *C03C 21/001* (2013.01); *C03C 15/00* (2013.01)

(58) Field of Classification Search
None
See application file for complete search history.

(56) References Cited

U.S. PATENT DOCUMENTS

| 3,779,732 A | 12/1973 | Spanoudis ..................... 65/31 |
| 3,975,175 A | 8/1976 | Foster et al. |
| 4,911,743 A | 3/1990 | Bagby ............................. 65/31 |
| 5,468,346 A | 11/1995 | Bruce et al. .................... 216/34 |
| 5,804,317 A | 9/1998 | Charrue ....................... 428/410 |
| 8,273,262 B2 | 9/2012 | Saijo et al. .................... 216/97 |
| 8,889,254 B2 | 11/2014 | Bayne et al. |
| 2006/0070980 A1 | 4/2006 | Marumo et al. |
| 2008/0014754 A1 | 1/2008 | Kiehlbauch et al. |

(Continued)

FOREIGN PATENT DOCUMENTS

| CN | 1044448 A | 8/1990 |
| DE | 3918744 A1 | 12/1989 |

(Continued)

OTHER PUBLICATIONS

Spierings, "Review Wet chemical etching of silicate glasses in hydrofluoric acid based solutions", J. Mat. Science, vol. 28, 1993, pp. 6261-6273.*

(Continued)

*Primary Examiner* — Lisa Herring
(74) *Attorney, Agent, or Firm* — Payal A. Patel; Jeffrey A. Schmidt

(57) ABSTRACT

Disclosed herein are methods for strengthening glass articles having strength-limiting surface flaws, together with strengthened glass articles produced by such methods, and electronic devices incorporating the strengthened glass articles. The methods generally involve contacting the glass articles with a substantially fluoride-free aqueous acidic treating medium for a time at least sufficient to increase the rupture failure points of the glass articles.

19 Claims, 2 Drawing Sheets

(56) References Cited

U.S. PATENT DOCUMENTS

| | | |
|---|---|---|
| 2008/0041823 A1 | 2/2008 | La et al. |
| 2009/0110914 A1 | 4/2009 | Zhuang et al. ............... 428/335 |
| 2009/0197048 A1 | 8/2009 | Amin et al. ................... 428/142 |
| 2010/0009154 A1 | 1/2010 | Allan et al. |
| 2011/0079931 A1 | 4/2011 | Miller et al. |
| 2011/0165393 A1 | 7/2011 | Bayne et al. ................. 428/215 |

FOREIGN PATENT DOCUMENTS

| | | | |
|---|---|---|---|
| EP | 0692463 | 4/1999 | |
| EP | 2202208 A1 | 6/2010 | |
| GB | 597591 | 1/1948 | |
| JP | 2000154040 A | 6/2000 | |
| JP | 200223703 A | 8/2002 | |
| JP | 2004091291 A | 3/2004 | |
| JP | 2010168262 | 8/2010 | |
| SU | 1046211 A | 10/1983 | ............ C03C 23/00 |
| SU | 1110765 | 8/1984 | |
| SU | 1237646 A1 | 6/1986 | ............ C03C 15/00 |
| WO | 9948824 | 9/1999 | |
| WO | WO2012074943 A1 | 6/2012 | ............ C03C 15/00 |
| WO | WO2012093525 A1 | 7/2012 | ............ C03C 15/00 |

OTHER PUBLICATIONS

Patent Cooperation Treaty International Notification of Transmittal of the International Search Report and the Written Opinion of the International Searching Authority, international application No. PCT/US2012/064318: mailing date Sep. 3, 2014, 17 pages.

Chemical Abstracts, Chemical Abstracts Service (CAS) US, Dec. 16, 1991.

B. Proctor; "The Effects of Hydrofluoric Acid Etching on the Strength of Glass"; Physics and Chemistry of Glasses; vol. 3, No. 1; Feb. 1962; pp. 7-27.

CN201280065947.X First Office Action Dated Dec. 31, 2015.

JP2014541300 Office Action Dated Dec. 1, 2015.

Kanunnikova et al., "Effect of Surface Layer Treatment of Lead-Silicate Glasses on Their Composition and Structure", Glass and Ceramics, vol. 52, Nos. 7-8, 1995.

\* cited by examiner

ACID STRENGTHENING OF GLASS

CROSS-REFERENCE TO RELATED APPLICATIONS

This application is a continuation and claims the benefit of priority under 35 U.S.C. §120 of U.S. patent application Ser. No. 13/673,255, filed on Nov. 9, 2012, which claims the benefit of priority under 35 U.S.C. §119 of U.S. Provisional Application Ser. No. 61/558,105, filed on 10 Nov. 2011, the contents of which are relied upon and incorporated herein by reference in their entirety as if fully set forth below.

TECHNICAL FIELD

The present disclosure relates generally to glass strengthening methods. More particularly, the various embodiments described herein relate to methods of strengthening glass articles using acidic media such that the acid-strengthened glass articles exhibit improved resistance to flexural strain and impact damage, as well as to the acid-strengthened glass articles produced thereby and devices that implement the acid-strengthened glass articles.

BACKGROUND

Glass articles having the optical and mechanical characteristics required for use in information displays for consumer electronic devices such as cell phones, media players, computers, and televisions are presently in high demand. The performance attributes of such articles that are valued by manufacturers and users of electronic devices include low thickness, excellent optical quality, high resistance to surface damage from abrasion, and strength sufficient to withstand breakage or chipping from impacts or applied bending stresses, among others.

The resistance of glass articles to impact and flexural damage is generally determined by standardized flexural (bending) breaking stress as well as ball drop (impact) testing. As is known, the measured strengths of glass articles determined by such methods can be highly variable, depending in large part on the way in which the glass is prepared for testing and handled prior to testing. For consumer applications comprising glass articles, ball drop and bending strength test results indicating reduced variability in strength are as important to device designers as are results indicating high overall strength.

A number of methods for improving the mechanical properties of thin glass articles (e.g., having thicknesses of less than or equal to about 2 millimeters) for information displays are in current commercial use or under extensive development. Glass tempering methods for improving impact and flexural strength are well known and include, for example, chemical tempering (ion-exchange strengthening) methods that can develop high levels of compressive stress in the surfaces of such sheets.

As suggested above, although glass tempering methods can produce articles exhibiting very high resistance to impact and flexural damage, strength levels measured after tempering can be undesirably variable with some samples having high strength while others have significantly reduced strength. This strength variability has been attributed at least in part to the presence of handling-induced surface flaws in the articles prior to tempering. Among the measures being developed to address the problem of strength variability are glass etching treatments that can remove the flawed surfaces from such articles, either before or subsequent to tempering. In general, such treatments involve the use of fluoride-based chemical etchants, including such compounds as HF, NaF, and $NH_4HF_2$.

While glass surface etching methods have been shown to be effective for reducing strength variability in tempered glass articles, a number of problems attending the use of such methods, even beyond the high cost of etchants such as HF, have been identified. Most significant are the handling requirements for HF that present significant problems in large scale manufacturing environments. Further, fluoride etching produces significant quantities of by-product fluorides such as $Na_2SiF_6$, $K_2SiF_6$, $CaF_2$, and the like that precipitate and collect to form sludge in etching tanks. Such sludge must be periodically removed and disposed of at considerable expense.

Also problematic is the aggressive nature of fluoride etchants. While a focused surface flaw removal or reduction treatment alone should be sufficient to improve glass strength, solutions containing fluoride ions rapidly etch the entire surfaces of the glass articles. As a consequence, even a brief exposure (e.g., two to five minutes) to an etching solution such as an $HF/H_2SO_4$ solution, which is effective to remove as little as 1.5 micrometers of surface glass from a flawed article, is equivalent to removing about 1500 pounds of glass, and can produce as much as 10,000-20,000 pounds of etched glass waste solution, for each 1 million square feet of glass being treated.

Other problems associated with the use of aggressive etchants include the possibility of non-uniform surface removal. Undesirable results of such removal can include reductions in article surface flatness or thickness that can interfere with accurate electronic device deposition, as well as reductions in glass optical quality caused by general surface hazing or localized changes in surface reflectivity. Extensive etching can also expose surface scratches previously present only as undetectable and harmless subsurface sheet damage.

The above-noted problems clearly indicate that there remains a need for improved glass article strengthening methods that can provide substantial improvements in article strength without increasing strength variability and without increasing the cost or reducing the efficiency of existing commercial glass strengthening processes.

BRIEF SUMMARY

Described herein are various methods of strengthening glass articles using acidic media, along with strengthened glass articles and electronic devices that include the strengthened glass articles.

In accordance with the present disclosure, glass treatment methods that are effective to enhance glass strength and do not involve the use of aggressive chemical etchants are provided. These glass strengthening methods are effective to modify the geometry of surface flaws in a way that substantially reduces the tendency of strength-limiting flaws (i.e., flaws that readily propagate under applied stress) to cause failure of the glass article. For the purposes of the present disclosure, "flaws" are any non-uniformities in the glass, including pits, voids, cracks, or the like, whether visible or not to the naked eye. At the same time, the methods generally do not result in significant reductions in the size of the flaws or material changes in the chemical, optical, and physical characteristics of the glass surface. The result is a substantial increase in glass article strength without significant material removal that can lead to changes in glass surface quality, article thickness, and/or tempered surface compression levels.

One specific type of method involves providing a glass article that has strength-limiting surface flaws having a first shape as well as a first rupture failure point. This type of method includes contacting the glass article with a substantially fluoride-free aqueous acidic treating medium having a pH of less than or equal to about 3 to produce an acid-treated strengthened glass article that has a second rupture failure point, such that at least a subset of the strength-limiting surface flaws of the acid-treated strengthened glass article have a second shape, and such that the contacting occurs for a time at least sufficient to render the second rupture failure point higher than the first rupture failure point.

This type of method can further include a step of rinsing the acid-treated strengthened glass article to remove the substantially fluoride-free aqueous acidic treating medium therefrom.

This type of method can also include a step of incorporating the acid-treated strengthened glass article in an electronic device.

According to some implementations of this type of method, the glass article can be formed from a silicate glass, borosilicate glass, aluminosilicate glass, or boroaluminosilicate glass, which optionally includes an alkali or alkaline earth modifier.

According to some overlapping or different implementations of this type of method, the substantially fluoride-free aqueous acidic treating medium can be fluoride free. In other implementations, the substantially fluoride-free aqueous acidic treating medium can include about 0.001 weight percent to about 0.095 weight percent fluoride ions.

In certain overlapping or different implementations of this type of method, the substantially fluoride-free aqueous acidic treating medium can have a pH of less than or equal to about 1.

In certain overlapping or different implementations of this type of method, the substantially fluoride-free aqueous acidic treating medium includes HCl, HBr, $HNO_3$, $H_2SO_4$, $H_2SO_3$, $H_3PO_4$, $H_3PO_2$, HOAc, citric acid, tartaric acid, ascorbic acid, ethylenediaminetetraacetic acid, methanesulfonic acid, toluenesulfonic acid, a mixture thereof, or a combination comprising at least one of the foregoing acids. For example, in some cases, the substantially fluoride-free aqueous acidic treating medium includes HCl, $HNO_3$, $H_2SO_4$, $H_3PO_4$, or citric acid in combination with less than or equal to about 1500 parts per million of fluoride ions.

In certain overlapping or different implementations of this type of method, the second shape entails blunted crack tips.

In certain overlapping or different implementations of this type of method, the contacting can occur for a time at least sufficient to reduce a propagation tendency of the strength-limiting surface flaws but insufficient to reduce an average thickness of the glass article by more than about 1.25 micrometers.

In certain overlapping or different implementations of this type of method, the contacting can occur for a time insufficient to reduce an average thickness of the glass article by more than about 300 nanometers.

In certain overlapping or different implementations of this type of method, the second rupture failure point can be higher than the first rupture failure point by greater than or equal to about 10 percent.

In certain overlapping or different implementations of this type of method, the acid-treated strengthened glass article has a resistance to impact breakage that is at least about 40 percent higher than a resistance to impact breakage of the glass article, as measured by a ball drop test, which is described hereinbelow in more detail.

In certain overlapping or different implementations of this type of method, the glass article is an ion-exchange-strengthened glass article comprising a surface compressive stress layer extending inward from a surface thereof. In some of these cases, the contacting can occur for a time insufficient to reduce a level of compressive stress in the surface compressive stress layer by more than about 4 percent.

In addition to these methods, strengthened acid-treated glass articles having blunted crack tips are provided. For the purposes of the present disclosure, blunted crack tips can be quantified by a reduction in the value accounting for flaw geometry in the following equation relating fracture toughness to stress at failure for mode I crack opening of surface cracks in a finite solid:

$$K_{IC} = \sigma_f \sqrt{\Omega \pi a} \qquad \text{Equation (1)}$$

where $K_{IC}$ is the fracture toughness, a material constant, $\sigma_f$ is the measured stress at failure, $\Omega$ accounts for flaw geometry, free-surface effects, and form of loading, and a is the flaw depth.

From the equation, the measured stress value at failure $\sigma_f$ can increase with either a reduction in flaw depth, a, or another change in flaw geometry such as by flaw blunting that reduces $\Omega$. In the case of the present methods and glass articles, it is the latter that provides the improved strength in the glass articles after acid treatment.

One specific type of glass article includes an acid-treated strengthened glass article made by one or more implementations of the methods described above and hereinbelow.

Finally, also provided are electronic devices that include strengthened acid-treated glass articles. One specific type of electronic device includes an acid-treated strengthened glass article produced by one or more implementations of the methods described above and hereinbelow.

Another specific type of electronic device includes an information display incorporating an acid-treated strengthened glass article produced by one or more implementations of the methods described above and hereinbelow.

Although not limited thereto, particular embodiments of such a device include computers, televisions, wireless telephones or media players. Advantageously, embodiments of such devices are provided wherein the acid-treated strengthened glass article incorporates one or more electronic components imparting touch-screen functionality to the information display.

It is to be understood that both the foregoing brief summary and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

Figure 1:
FIG. 1 is schematic illustration of an electronic device incorporating an information display comprising a strengthened acid-treated glass article.
Figure 2:
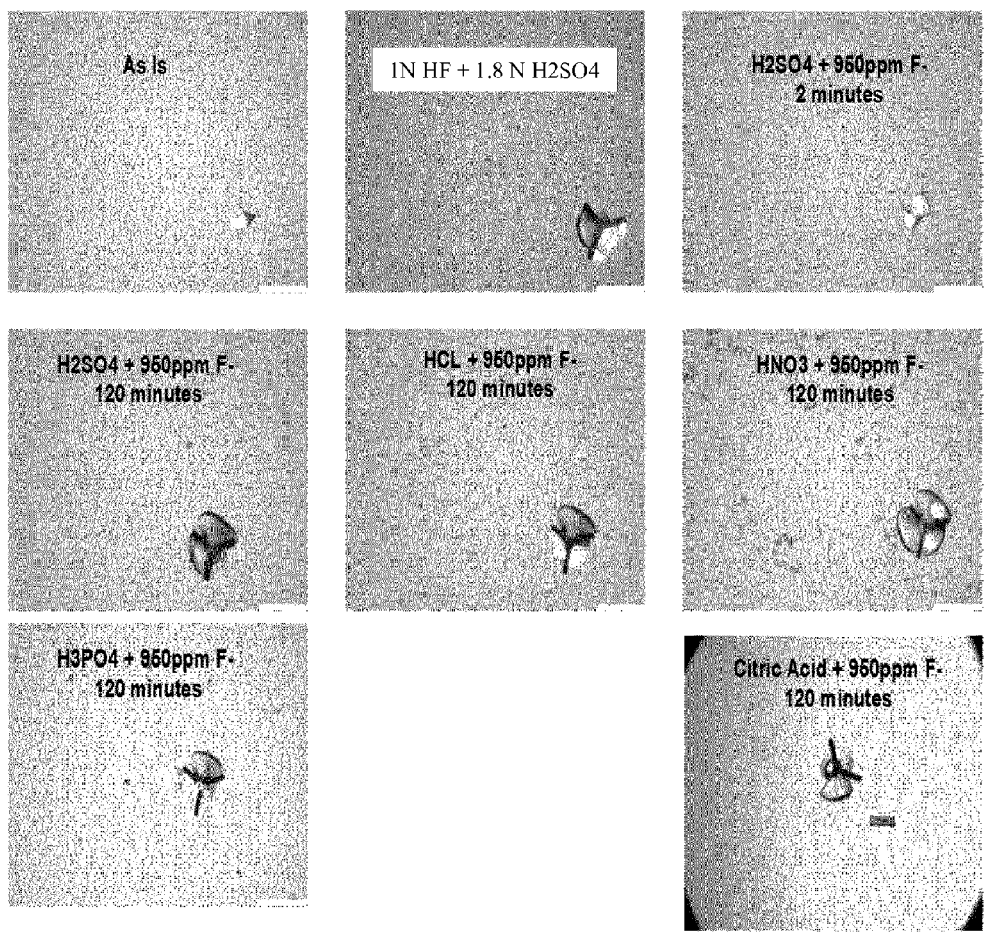
FIG. 2 includes high resolution images of crack behavior before and after acid treatment in accordance with EXAMPLE 2.

These and other aspects, advantages, and salient features will become apparent from the following detailed description, the accompanying drawings, and the appended claims.

DETAILED DESCRIPTION

Referring now to the figures, wherein like reference numerals represent like parts throughout the several views, exemplary embodiments will be described in detail. Throughout this description, various components may be identified having specific values or parameters. These items, however, are provided as being exemplary of the present disclosure. Indeed, the exemplary embodiments do not limit the various aspects and concepts, as many comparable parameters, sizes, ranges, and/or values may be implemented. Similarly, the terms "first," "second," "primary," "secondary," "top," "bottom," "distal," "proximal," and the like, do not denote any order, quantity, or importance, but rather are used to distinguish one element from another. Further, the terms "a," "an," and "the" do not denote a limitation of quantity, but rather denote the presence of "at least one" of the referenced item.

The methods described herein generally involve contacting a glass article that has strength-limiting surface flaws of a first shape with a substantially fluoride-free aqueous acidic treating medium. As used herein, the phrase "substantially fluoride-free" means that the medium comprises less than or equal to about 0.15 weight percent (wt %) (i.e., 1500 parts per million (ppm)) of fluoride ions based on the total weight of the medium. The contacting step is carried out for a time at least sufficient to provide an acid-treated strengthened glass article having a bending rupture strength that is greater than that of the untreated glass article. In addition, at least a subset of the strength-limiting surface flaws are modified to have a second shape after the contacting step.

The choice of glass material is not limited to a particular composition, as the methods described herein can be applied using a variety of glass compositions. For example, the material chosen can be any of a wide range of silicate, borosilicate, aluminosilicate, or boroaluminosilicate glass compositions, which optionally can comprise one or more alkali and/or alkaline earth modifiers. Similarly, the disclosed treatment methods are applicable to surface-flawed glasses in many physical forms, including annealed (stress-free) flat or curved glass articles, laminated glass articles, and tempered glass articles having strengthening compressive surface stress layers that are produced, for example, by thermal or chemical tempering methods.

By way of illustration, one class of glass compositions includes the following constituents: 58-72 mole percent (mol %) $SiO_2$; 9-17 mol % $Al_2O_3$; 2-12 mol % $B_2O_3$; 8-16 mol % $Na_2O$; and 0-4 mol % $K_2O$, wherein the ratio $$\frac{Al_2O_3(mol\ \%) + B_2O_3(mol\ \%)}{\sum modifiers(mol\ \%)} > 1,$$

where the modifiers (mol %) modifiers comprise alkali metal oxides. Another class of glass compositions includes the following constituents: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO. Yet another illustrative class of glass compositions includes the following constituents: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 parts per million (ppm) $As_2O_3$; and less than 50 ppm $Sb_2O_3$; wherein 12 mol %≤$Li_2O$+$Na_2O$+$K_2O$≤20 mol % and 0 mol %≤MgO+CaO≤10 mol %. Still another illustrative class of glass compositions includes the following constituents: 55-75 mol % $SiO_2$, 8-15 mol % $Al_2O_3$, 10-20 mol % $B_2O_3$; 0-8% MgO, 0-8 mol % CaO, 0-8 mol % SrO and 0-8 mol % BaO. Specific illustrative glass compositions, which are in addition to glass compositions that fall within the above-recited broad classes, are provided in Table 1 below.

TABLE 1

Specific Glass Compositions

| | Glass | | | | |
|---|---|---|---|---|---|
| Component | 1 mol % | 2 mol % | 3 mol % | 4 mol % | 5 mol % |
| $SiO_2$ | 68 | 71 | 66 | 72 | 64 |
| $Al_2O_3$ | 11 | 12 | 11 | 1 | 12.5 |
| $B_2O_3$ | 10 | 1 | 8 | | 10 |
| CaO | 9 | 5 | 5 | 9 | |
| MgO | 2 | 5 | 5 | 6 | |
| SrO | 1 | 1 | 5 | | |
| BaO | | 4 | | | |
| $Na_2O$ | | | | 12 | 13 |
| $K_2O$ | | | | 1 | 0.5 |
| Anneal Pt (° C.) $10^{13.2}$ Poise | 723 | 787 | 722 | 552 | 574 |

The thickness of the glass articles to be treated in accordance with the disclosed methods is not a factor affecting the results of the treatments, but use for the treatment of surface-flawed articles of relatively slight thickness, such as employed, for example, in the construction of lightweight portable electronic devices like cellular telephones, handheld devices, tablets, and the like offers particular advantages. Thin glass articles are needed to secure light weight and increased flexibility for any of these types of devices, but the surface stresses resulting from flexure in glass of thin cross-section can be high. Using the disclosed methods to produce acid-treated glass articles having an average thickness of about 0.02 to about 2.0 millimeters (mm) results in substantial flexural strength improvements that are beneficial for such end uses.

There is no particular limitation on the composition of the aqueous acidic treating medium, with the exception that it be substantially fluoride-free. As stated above, the phrase "substantially fluoride-free" means that the medium comprises less than or equal to about 0.15 wt % (i.e., 1500 ppm) of fluoride ions based on the total weight of the medium. Thus, in some implementations, the aqueous acidic treating medium can have no fluoride ions. In many implementations, however, a source of fluoride ions (e.g., from HF, NaF, $NH_4HF_2$, or the like) will be present. For example, in some embodiments, the substantially fluoride-free aqueous acid treating medium will include up to about 0.1 wt % of fluoride ion. In some of these embodiments, the substantially fluoride-free aqueous acid treating medium can include about 0.001 to about 0.095 wt % of fluoride ion.

A variety of acidic compounds can be used, either alone or in combination, to formulate the substantially fluoride-free aqueous acidic treating media suitable for carrying out surface flaw modification treatments in accordance with the present disclosure. In particular embodiments, the aqueous acidic treating medium employed for increasing the bending strength of the sheet comprises a mineral or organic acid including chelating organic acids, such as an aqueous solution of the acid. Illustrative examples of such acids include HCl, HBr, $HNO_3$, $H_2SO_4$, $H_2SO_3$, $H_3PO_4$, $H_3PO_2$, HOAc, citric acid, tartaric acid, ascorbic acid, EDTA, methanesulfonic acid, toluenesulfonic acid, mixtures thereof, and combinations comprising at least one of the foregoing.

In general, the substantially fluoride-free aqueous acidic treating medium will have a pH of less than or equal to about 3. In certain implementations, however, the substantially fluoride-free aqueous acidic treating medium will have a pH of less than or equal to about 1.

Once the specific glass article and substantially fluoride-free acidic treating medium are chosen, as desired for the particular application, the substantially fluoride-free acidic treating medium can be contacted with the glass article. The step of contacting can be implemented by a variety of techniques. These include including spraying the substantially fluoride-free acidic treating medium onto the glass article, partially or completely immersing the glass article in a vessel that comprises the substantially fluoride-free acidic treating medium, or other like techniques for applying a liquid to a solid.

Without intending to be bound by theory, it is believed that the mechanism underlying the strength improvements achieved through the use of the present methods is a change in the crack propagation characteristics of the glass, due to a blunting of at least some of the strength-limiting surface flaws present in the glass through the action of the substantially fluoride-free acidic treating media. On the other hand, it is not desired that contact be so prolonged as to remove significant quantities of surface glass from the treated articles, since such removal can risk reductions in glass surface quality and/or reduce glass article thickness. Extensive surface removal is also undesirable where the treatments are to be applied to tempered glass, since such removal will necessarily reduce the thicknesses of the surface compression layers, and therefore the levels of surface compressive stress, that are responsible for the enhanced strengths of such articles.

For the above reasons, in exemplary embodiments, the contacting step should be carried out for a time at least sufficient to reduce the propagation tendencies of at least the larger strength-limiting surface flaws in the glass, but insufficient to materially reduce the average thickness of the glass articles. As used herein, a "material reduction" in average thickness is considered to be a reduction in excess of 1.25 micrometers (µm) in average thickness. In certain implementations, the contacting step results in a reduction in average thickness of the glass articles of less than or equal to about 1 µm. In situations where minimal thickness reduction is desired, the contacting step can be carried such that the reduction in average thickness of the glass articles is less than or equal to about 300 nanometers (nm).

Reductions in the propagation tendencies of strength-limiting surface flaws in treated glass articles are indicated in the first instance by significant increases in the rupture strengths or rupture failure points of the treated articles. The term "rupture failure point" refers to the load of force and/or stress at failure (breakage) of a glass article under flexural strength testing. A further measure of the effects of flaw depth reductions or other flaw shape modifications on the propagation tendencies of such cracks (both reductions or modifications resulting in "crack blunting" as used herein), is the ratio of the fracture toughness $K_{IC}$ of the particular glass to the stress at failure $\sigma_f$ a treated sample of that particular glass. As seen from Equation (1) above, that ratio corresponds to the value of the expression $\sqrt{\Omega\pi a}$, as further discussed below.

While the methods can be used to enhance the strength of glass articles having surface flaws regardless of whether the articles previously have been subjected to a tempering treatment, embodiments wherein the glass article is a tempered glass article, and particularly wherein the tempered article is an ion-exchange-strengthened glass article, are of particular value. The minimization of surface glass removal in these embodiments avoids undesirable reductions in surface compression layer thicknesses and stress levels in tempered glasses. For the treatment of such glasses, therefore, the step of contacting is carried out only for a time that prevents a material reduction in the level of surface compression in the glass article. As used herein, the term "material reduction in surface compression" means that a reduction of less than or equal to about 4% in the level of surface compression is observed after the contacting step.

Once the contacting step is completed, the strengthened acid-treated glass article is produced. In certain implementations of the methods described herein, the methods can include a step of rinsing the strengthened acid-treated glass article to remove any presence of the substantially fluoride-free aqueous acidic medium. In overlapping or alternative implementations, the methods can further include a step of incorporating the strengthened acid-treated glass article in an electronic device.

As stated above, the formed strengthened acid-treated glass articles have substantially the same thickness as the untreated glass articles (i.e., within about 1.25 µm), and exhibit an increased rupture failure point than the untreated glass articles. At least a subset of the strength limiting surface flaws in the untreated glass articles exhibit reduced propagation tendencies after the acid treatment owing to a change in their geometries. In general, those strength limiting surface flaws that undergo a change in geometry have blunted crack tips after the acid treatment, as can be evidenced by surface characterization techniques such as optical microscopy.

In addition, in certain implementations, the strengthened acid-treated glass articles produced herein can have higher rupture failure points than if the glass article were treated with a high fluoride-ion-containing medium for strengthening.

As stated above, the "rupture failure point" refers herein to the load of force and/or stress at failure (breakage) of a glass article under flexural strength testing. For the purposes of the present disclosure, this property is measured using a ring-on-ring test. In such a test, each sample is subjected to flexural stress to the point of breakage in an apparatus that supports the bottom surface of each sample on a ring of about 1-inch (about 12.7 mm) diameter while applying bi-axial flexural stress to the top surface using a ring of about 0.5-inch (about 25.4 mm) diameter centered on the bottom ring. Flexural stress is applied to each sample at a rate of about 1.2 mm per minute via the ring on the top surface. The relationship between load and stress for each glass sample subjected this ring-on-ring loading can be determined experimentally using strain gauges. The results of this type of test are reported using Weibull plots (i.e., where the horizontal axis of the plot indicates the failure loads, η, applied at the point of breakage for each samples in a series in kilograms of force (kgf), while and the vertical axis indicates the percent failure probability P (%) for the samples in each series). For the purposes of the present disclosure, the rupture failure point shall be defined as the failure load, ρ, in kilograms force (kgf) corresponding to the 62.5% failure probability load level for a series of 10 samples.

In general, at least a 10% improvement in the rupture failure point can be observed in the strengthened acid-treated glass articles relative to untreated glass articles. In certain implementations, at least a 30% improvement in the rupture failure point can be observed.

In many embodiments, the strengthened acid-treated glass articles produced herein exhibit significantly improved resistance to impact breakage, as evaluated by methods such as a ball drop test. In such a test, vinyl tape or other like adhesive is placed over the whole bottom side of a sample, and a pressure sensitive adhesive tape (e.g., SCOTCH tape) is placed over the whole top side of the sample. A spherical ball of a certain weight can be dropped onto the top side of the sample from a specific height, and raised at specific increments until the sample fails or until the ball is dropped from a specified maximum height. For the purposes of the present disclosure, the ball used to evaluate the impact breakage resistance of the glass articles is a 222 gram stainless steel ball, and the initial ball drop height is about 15 centimeters (cm). The height increase increments in this test are about 5 cm, and the maximum height that the stainless steel ball is dropped is about 180 cm.

In general, at least a 40% improvement in the resistance to impact breakage (as measured by the ball drop height at breakage) can be observed in the strengthened acid-treated glass articles relative to untreated glass articles. In certain implementations, at least a 100% improvement in the resistance to impact breakage can be observed.

In many instances, the strengthened acid-treated glass articles produced herein exhibit no breakage when the ball is dropped from a height of over 100 cm. In fact, in exemplary embodiments, the strengthened acid-treated glass articles produced herein exhibit no failure height (i.e., the glass articles do not fail when the 222 gram stainless steel ball is dropped from a height of about 180 cm).

As discussed above, strengthened acid-treated glass articles made in accordance with the methods described herein are well suited for use in the manufacture of information displays for electronic devices. Particular embodiments of such articles include treated glass sheets having average thicknesses of about 0.2 to about 2.0 mm, which, even in slight cross-section, provide flexural strengths and impact and abrasion damage resistance adequate for use in portable electronic devices (e.g., wireless telephones, hand-held devices, and tablets) that may be subjected to severe handling misuse.

An illustrative example of an electronic device comprising an information display incorporating a strengthened acid-treated glass article in accordance with the present disclosure is schematically illustrated in FIG. 1. The illustrated example is that of a device such as a wireless (e.g., cellular) telephone 10, that device comprising an input section 12 for device input and an information display section 14 for information output. Information display section 14 incorporates an acid treated glass sheet 16, which may support active display elements such as LCD elements (not shown). In particular embodiments of such devices, the acid-treated glass sheets incorporate one or more electronic components that impart touch-screen functionality to the information display.

The various embodiments of the present disclosure are further illustrated by the following non-limiting examples.

EXAMPLES

Example 1

In this example, the effectiveness of the methods described herein for strengthening thin alkali aluminosilicate glass articles is demonstrated in terms of flexural rupture strength tests on treated and untreated samples of such a glass. Table 2 below sets forth representative results for such strength tests as conducted on samples of alkali-containing glass having an area of about 25 square centimeters (cm²) and a thickness of about 1.3 mm, such glass having a nominal composition as follows (in mol % based on oxides): 69 mol % $SiO_2$, 9 mol % $Al_2O_3$, 14 mol % $Na_2O$, 1 mol % $K_2O$, 6 mol % MgO, and 1 mol % CaO. All samples selected for evaluation were in "as-manufactured" condition (i.e., with pre-existing surface flaws resulting from handling during manufacture and without any pre-treatment, such as tempering). Ten samples were evaluated for each of the sample groups included in Table 2.

The samples from the untreated group (U) in Table 2 were tested without any surface treatment of the samples. The samples from groups 1, 2, 3 and 4 were treated with a fluoride-free aqueous acidic medium in accordance with the methods disclosed herein, that solution consisting of 3.3N aqueous $H_2SO_4$. The samples in group 5 were treated with a fluoride-containing glass etching solution consisting of a combination of HF and $H_2SO_4$ at concentrations of 1.5N and 1.8N, respectively, that solution being designed as a comparative example to etch sufficient glass from the surfaces of the samples to substantially reduce or remove pre-existing surface flaws therefrom.

The strength testing of treated and untreated samples was carried out using ring-on-ring flexural strength testing using an Instron mechanical testing machine. Flexural stress was applied to each of the samples at a loading rate of 1.2 mm/minute via a loading ring of 12.7 mm diameter concentrically disposed over a support ring of 25.4 mm diameter on which each of the samples was supported. The relationship between load and stress for glass samples subjected to ring-on-ring loading was determined experimentally using strain gauges.

The strength results reported for each of the treatments listed in Table 2 are based on Weibull plots of failure load for the 10 sheet samples in each treatment group, the reported failure load, η, corresponding to the 62.5% failure probability load level, in kilograms force (kgf), for each group. The Weibull plot slope β for each treatment group is reported along with the corresponding failure load level. Also included in Table 2 for each of the sample groups tested are the time and temperature of the treatment, the percent increases in failure load resulting from the treatment, and the thickness of the layer of surface glass removed from the samples as calculated from the weight of dissolved glass in the treatment solution following treatment.

rupture loads, or failure loads, by about 10 to about 40%, results that are substantially equivalent to or better than the failure load increases provided by the aggressive etching medium comprising HF of group 5. More importantly, the non-fluoride-containing acid washing treatments are found to remove only negligible amounts of surface glass (i.e., less than 0.0002 grams of surface glass, equivalent to a surface layer removal thickness of less than 20 nm) from each sheet sample.

Average loads and stresses at failure for the samples characterized in Table 2 above are reported in Table 3 below. Also included in Table 3 are values for the expression $\sqrt{\Omega \pi a}$ from Equation (1) above, as calculated from the failure data and the known fracture toughness of the glass for which the composition was provided above (about 0.7 MPa $m^{0.5}$, as measured by the Chevron notch test, where m is in units of meters). As noted above, that expression corresponds in Equation (1) to the ratio of the fracture toughness $K_{IC}$ of the glass (in units of MPa·$m^{0.5}$) to the measured stresses at failure $\sigma_f$ (in units of MPa) of each of the samples of that glass. Since the value of $\sqrt{\Omega \pi a}$ (in units of $m^{0.5}$) takes into account both flaw depth (a) and flaw "shape" (Ω), that value directly reflects the effects of the presently disclosed treatments on the flaw configuration factors affecting the propagation characteristics of the strength-limiting surface flaws that cause stress failures in surface-flawed glass sheets.

The "Improvements in Stress to Failure" given in Table 2 are percent improvements calculated from the expression: ($\sigma_f$ [treated sample]/$\sigma_f$ [untreated sample]×100)–100. The "Improvements in $\sqrt{\Omega \pi a}$" are percent improvements (i.e., % decreases) calculated from the expression: 100–(100×{$\sqrt{\Omega \pi a}$ [treated sample]/$\sqrt{\Omega \pi a}$ [untreated sample]}), since the lower values of $\sqrt{\Omega \pi a}$ seen for the treated samples yield greater percentage improvements than the higher value for the untreated glass. Embodiments of the disclosed methods wherein the improvements in either or both of $\sqrt{\Omega \pi a}$ and $\sigma_f$ exceed 5% are particularly beneficial.

The results presented in Table 3 above demonstrate the effectiveness of non-fluoride-containing acid treatments (groups 1-4) for modifying the flaw configuration factors affecting $\sqrt{\Omega \pi a}$ values and thus the resulting failure stresses $\sigma_f$ over the levels exhibited by untreated glass (Sample U), and even over the levels exhibited by fluoride-treated glass

TABLE 2

Glass Surface Treatments

| Sample Group ID | Treatment solution (concentration) | Treatment Time/Temp. | η(kg), (β) | η Increase (%) | Glass Surface Removal (μm) |
|---|---|---|---|---|---|
| U | None | None | 224, (2.58) | | |
| 1 | $H_2SO_4$ (3.3N) | 2 min, 22° C. | 257, (2.24) | 16 | <0.02 |
| 2 | $H_2SO_4$ (3.3N) | 20 min, 22° C. | 307, (3.09) | 40 | <0.02 |
| 3 | $H_2SO_4$ (3.3N) | 120 min, 22° C. | 243, (3.08) | 10 | <0.02 |
| 4 | $H_2SO_4$ (3.3N) | 120 min, 80° C. | 252, (3.45) | 15 | <0.02 |
| 5 | HF (1.5N) + $H_2SO_4$ (1.8N) | 2 min, 22° C. | 254, (1.73) | 15 | 1.5 |

The representative load-to-failure data presented in Table 2 demonstrate that the treatment of surface-flawed glass sheets with a relatively non-aggressive acid treating medium such as a sulfuric acid solution can increase sheet flexural (group 5). Failure stresses are increased over untreated glass by greater than about 5% (i.e., by 7-28%) being equal to or in some cases better than the 10% improvement of the HF-treated samples of group 5. Likewise the values of ($\sqrt{\Omega\pi a}$) are improved by greater than about 5% over untreated glass (i.e., by 6-22%), and again are equal to or better than the 9% improvement seen through the HF treatment of the glass (group 5).

TABLE 3

Treatment Effects on Average Failure Stresses and $\sqrt{\Omega\pi a}$ Values

| Sample Group ID | Load, (kgf) | Stress at Failure, (MPa) | $\sqrt{\Omega\pi a}$ ($K_{IC}/\square\square$) (meters$^{0.5}$) | Improvement in Stress at Failure, (%) | Improvement in $\sqrt{\Omega\pi a}$ (%) |
|---|---|---|---|---|---|
| U | 224 | 527 | 1.33E-03 | 0 | 0 |
| 1 | 257 | 587 | 1.19E-03 | 11 | 10 |
| 2 | 307 | 672 | 1.04E-03 | 28 | 22 |
| 3 | 243 | 562 | 1.25E-03 | 7 | 6 |

TABLE 3-continued

Treatment Effects on Average Failure Stresses and $\sqrt{\Omega\pi a}$ Values

| Sample Group ID | Load, (kgf) | Stress at Failure, (MPa) | $\sqrt{\Omega\pi a}$ ($K_{IC}/\square\square$) (meters$^{0.5}$) | Improvement in Stress at Failure, (%) | Improvement in $\sqrt{\Omega\pi a}$ (%) |
|---|---|---|---|---|---|
| 4 | 252 | 578 | 1.21E-03 | 10 | 9 |
| 5 | 254 | 581 | 1.20E-03 | 10 | 9 |

Thus, in this example, the substantially fluoride-free aqueous acidic treating medium was fluoride free, and produced an increase in flexural rupture loads by about 10 to about 40% while removing less than or equal to about 20 nm of average thickness of the glass articles. In addition, these glass samples produced in accordance with the methods described herein performed about equal to or better than glass samples treated with a high-fluoride containing acidic treating medium.

Example 2

In this example, the effectiveness of the methods described herein for strengthening thin alkali aluminosilicate glass articles is demonstrated in terms of flexural rupture strength tests on treated and untreated samples of such a glass. The samples used had the same general dimensions and compositions as the glass samples in EXAMPLE 1.

All samples were intentionally flawed with a 5 gram Cube Corner indentation prior to etching with the various treating media. Comparisons were made to an "as-manufactured" glass samples (control) and samples treated with a high fluoride-containing solution consisting of a combination of HF and $H_2SO_4$ at concentrations of 1.5N and 1.8N, respectively after the 5 gram indentation. Table 4 provides the components and conditions for the 8 different sample groups.

Ten samples of each sample group were submerged in the solutions and under the conditions provided in Table 4. All treated samples were treated at room temperature (about 22° C.).

Nine samples from each of the eight sets were subjected to ring-on-ring testing using a 500 kg load cell and the same procedure defined in EXAMPLE 1. One sample from each set was kept for high resolution imaging to observe crack tip behavior resulting from the various treatments.

TABLE 4

Glass Surface Treatments

| Sample Group ID | Treatment solution (concentration) | Treatment Time | Ring-on-Ring Load (kgf) | Load Increase (%) | Glass Surface Removal (μm) |
|---|---|---|---|---|---|
| U | None | None | 44 | | |
| 1 | HF (1.5N) + $H_2SO_4$ (1.8N) | 2 min | 188 | 328 | 1.75 |
| 2 | 3.3N $H_2SO_4$ + 950 ppm $F^-$ (via HF) | 2 min | 49 | 11 | <0.02 |
| 3 | 3.3N $H_2SO_4$ + 950 ppm $F^-$ (via HF) | 120 min | 263 | 498 | 1.22 |
| 4 | 3.3N HCl + 950 ppm $F^-$ (via HF) | 120 min | 270 | 514 | 1.10 |
| 5 | 3.3N $HNO_3$ + 950 ppm $F^-$ (via HF) | 120 min | 154 | 250 | 0.83 |
| 6 | 3.3N $H_3PO_4$ + 950 ppm $F^-$ (via HF) | 120 min | 160 | 264 | 1.05 |
| 7 | 1M Citric + 950 ppm $F^-$ (via HF) | 120 min | 188 | 328 | 0.90 |

The representative load-to-failure data presented in Table 4 demonstrate that the treatment of surface-flawed glass sheets with a substantially fluoride-free acidic treating medium such as those used in sample groups 2-7 can increase sheet flexural rupture loads or failure loads by at least 10%, and in most cases by at least 250%. Some of these results are substantially equivalent to or better than the failure load increases provided by the aggressive etching medium comprising HF of group 1. In addition, the substantially fluoride-free acid treating media are found to not materially reduce the average thickness of the glass sheets.

Thus, in this example, the substantially fluoride-free aqueous acidic treating media comprised less than 1000 ppm fluoride ions, and produced an increase in flexural rupture loads by about 10 to about 250% while removing less than or equal to about 1.25 μm of average thickness of the glass articles. In addition, most of these glass samples produced in accordance with the methods described herein performed about equal to or better than glass samples treated with a high-fluoride containing acidic treating medium.

Example 3

In this example, the effectiveness of the methods described herein for strengthening thin alkali aluminosilicate glass articles is demonstrated in terms of flexural rupture strength and impact resistance tests on treated and untreated samples of such a glass. The samples used had the same general dimensions and compositions as the glass samples in EXAMPLE 1. All of the samples were subjected to an ion exchange chemical strengthening step, where the glass samples were immersed in a molten KNO₃ bath or about 8 hours at about 410° C. to produce compressive stress layers in the outer surfaces of the articles. The compressive stress layers generally had a compressive stress of about 774 megapascals (mPa) and a depth of layer of about 44 μm.

Comparisons were made to untreated glass samples (control) and samples treated with a high fluoride-containing solution consisting of a combination of HF and H₂SO₄ at concentrations of 1.5N and 1.8N, respectively, after the ion exchange. Table 5 provides the components and conditions for the 8 different sample groups.

20 samples of each sample group were submerged in the solutions and under the conditions provided in Table 5. All treated samples were treated at room temperature (about 22° C.).

TABLE 5

Glass Surface Treatments

| Sample Group ID | Treatment solution (concentration) | Treatment Time | Ring-on-Ring Load (kgf) (samples) | Ball Drop Height at Failure (cm) |
|---|---|---|---|---|
| U | No treatment | | 409 (10) | 45 |
| 1 | HF (1.5N) + H₂SO₄ (1.8N) | 2 min | 903 (9) | 180* |
| 2 | 1M H₃PO₄ + 1500 ppm F⁻ (via HF) | 120 min | 900 (11) | 175 |
| 3 | 1M Citric Acid + 950 ppm F⁻ (via HF) | 120 min | 677 (14) | 116 |
| 4 | 1M Citric Acid + 1500 ppm F⁻ (via HF) | 30 min | 492 (14) | 81 |
| 5 | 1M Citric Acid + 1500 ppm F⁻ (via HF) | 60 min | 803 (15) | 153 |
| 6 | 1M Citric Acid + 1500 ppm F⁻ (via HF) | 120 min | 738 (10) | 130 |
| 7 | 1M Citric Acid + 950 ppm F⁻ (via K₂SiF₆) | 120 min | 428 (10) | 64 |

Ball drop testing was carried out by placing vinyl tape on the tensile or bottom side of the sample and a small piece of scotch tape on the compression or top side of the sample. A 222 gram stainless steel ball was used. The ball was dropped starting at 15 cm at and was raised at 5 cm increments until sample failure. The maximum height the ball was dropped is 180 cm, which correlated to no failure of the sample.

Anywhere from 9 to 15 samples from each of the eight sets were subjected to ring-on-ring testing using a 1000 kg load cell and the same procedure defined in EXAMPLE 1. Samples that did not break under the 1000 kg load cell were re-run under a 2269 kg (5000 pound) load cell.

The representative impact resistance data presented in Table 5 demonstrate that the treatment of surface-flawed glass sheets with a substantially fluoride-free acidic treating medium such as those used in sample groups 2-7 can increase impact resistance by at least 40%, and in most cases by at least 150%.

The representative load-to-failure data presented in Table 5 demonstrate that the treatment of surface-flawed glass sheets with a substantially fluoride-free acidic treating medium such as those used in sample groups 2-7 can increase sheet flexural rupture loads or failure loads by at least 5%, and in most cases by at least 65%. Some of these results are substantially equivalent to or better than the failure load increases provided by the aggressive etching medium comprising HF of group 1. It should be noted that four samples from group 1, four samples from group 2, and two samples from group 5 were subjected to ring-on-ring testing using the 2269 kg load cell. The average failure load, in kgf, for these samples were 1137, 1172, and 1219, respectively.

Thus, in this example, the substantially fluoride-free aqueous acidic treating media comprised less than 1500 ppm fluoride ions, and produced an increase in impact resistance of about 40 to about 289% as well as an increase in flexural rupture loads by about 5 to about 198%. In addition, many of these glass samples produced in accordance with the methods described herein performed about equal to or better than glass samples treated with a high-fluoride containing acidic treating medium.

While the embodiments disclosed herein have been set forth for the purpose of illustration, the foregoing description should not be deemed to be a limitation on the scope of the disclosure or the appended claims. Accordingly, various modifications, adaptations, and alternatives may occur to one skilled in the art without departing from the spirit and scope of the present disclosure or the appended claims.

What is claimed is:

1. A method, comprising:
    providing a glass article, comprising:
        strength-limiting surface flaws having a first shape; and
        a first rupture failure point; and
    contacting the glass article with a treating medium to produce a strengthened glass article comprising a second rupture failure point, wherein
    at least a subset of the strength-limiting surface flaws of the strengthened glass article have a second shape,
    the contacting occurs for a time at least sufficient to render the second rupture failure point higher than the first rupture failure point,
    the contacting occurs for a time at least sufficient to reduce a propagation tendency of the strength-limiting surface flaws but does not reduce an average thickness of the glass article by more than about 300 nanometers,
    the treating medium comprises from about 0.001 to about 0.15 wt % of fluoride ions, and
    the second shape comprises blunted crack tips.

2. The method of claim 1, further comprising rinsing the strengthened glass article to remove the treating medium therefrom.

3. The method of claim 1, wherein the glass article comprises a silicate glass, borosilicate glass, aluminosilicate glass, or boroaluminosilicate glass.

4. The method of claim 3, wherein the glass article further comprises an alkali or alkaline earth modifier.

5. The method of claim 1, wherein the treating medium comprises HCl, HBr, $HNO_3$, $H_2SO_4$, $H_2SO_3$, $H_3PO_4$, $H_3PO_2$, HOAc, citric acid, tartaric acid, ascorbic acid, ethylenediaminetetraacetic acid, methanesulfonic acid, toluenesulfonic acid, a mixture thereof, or a combination comprising at least one of the foregoing acids.

6. The method of claim 1, wherein the treating medium comprises from about 0.001 to about 0.095 wt % of fluoride ions.

7. The method of claim 1, wherein the second rupture failure point is higher than the first rupture failure point by greater than or equal to about 10 percent.

8. The method of claim 1, wherein the strengthened glass article has a resistance to impact breakage that is at least about 40 percent higher than a resistance to impact breakage of the glass article, as measured by a ball drop test.

9. The method of claim 1, wherein the glass article is an ion-exchange-strengthened glass article comprising a surface compressive stress layer extending inward from a surface thereof.

10. The method of claim 1, wherein the second rupture failure point is higher than the first rupture failure point by greater than or equal to about 5 percent $\sqrt{\Omega \pi a}$,
where $\sqrt{\Omega \pi a}$ can be calculated from the equation $K_{IC} = \sigma_f \sqrt{\Omega \pi a}$, and where
$K_{IC}$ is the fracture toughness, a material constant,
$\sigma_f$ is the measured stress at failure,
$\Omega$ accounts for flaw geometry, free-surface effects, and form of loading, and
a is the flaw depth.

11. A method, comprising:
providing a glass article, comprising:
strength-limiting surface flaws having a first shape; and
a first rupture failure point; and
contacting the glass article with a treating medium to produce a strengthened glass article comprising a second rupture failure point, wherein
at least a subset of the strength-limiting surface flaws of the strengthened glass article have a second shape,
the contacting occurs for a time at least sufficient to render the second rupture failure point higher than the first rupture failure point,
the glass article is an ion-exchanged strengthened glass article comprising a surface compressive stress layer extending inward from a surface thereof,
the contacting occurs for a time insufficient to reduce a level of compressive stress in the surface compressive stress layer by more than about 4 percent,
the treating medium comprises from about 0.001 to about 0.15 wt % of fluoride ions, and
the second shape comprises blunted crack tips.

12. The method of claim 11, further comprising rinsing the strengthened glass article to remove the treating medium therefrom.

13. The method of claim 11, wherein the glass article comprises a silicate glass, borosilicate glass, aluminosilicate glass, or boroaluminosilicate glass.

14. The method of claim 13, wherein the glass article further comprises an alkali or alkaline earth modifier.

15. The method of claim 11, wherein the treating medium comprises HCl, HBr, $HNO_3$, $H_2SO_4$, $H_2SO_3$, $H_3PO_4$, $H_3PO_2$, HOAc, citric acid, tartaric acid, ascorbic acid, ethylenediaminetetraacetic acid, methanesulfonic acid, toluenesulfonic acid, a mixture thereof, or a combination comprising at least one of the foregoing acids.

16. The method of claim 11, wherein the treating medium comprises from about 0.001 to about 0.095 wt % of fluoride ions.

17. The method of claim 11, wherein the second rupture failure point is higher than the first rupture failure point by greater than or equal to about 10 percent.

18. The method of claim 11, wherein the strengthened glass article has a resistance to impact breakage that is at least about 40 percent higher than a resistance to impact breakage of the glass article, as measured by a ball drop test.

19. The method of claim 11, wherein the second rupture failure point is higher than the first rupture failure point by greater than or equal to about 5 percent a $\sqrt{\Omega \pi a}$,
where $\sqrt{\Omega \pi a}$ can be calculated from the equation $K_{IC} = \sigma_f \sqrt{\Omega \pi a}$, and where
$K_{IC}$ is the fracture toughness, a material constant,
$\sigma_f$ is the measured stress at failure,
$\Omega$ accounts for flaw geometry, free-surface effects, and form of loading, and
a is the flaw depth.

* * * * *

UNITED STATES PATENT AND TRADEMARK OFFICE
CERTIFICATE OF CORRECTION

| | | |
|---|---|---|
| PATENT NO. | : 9,505,653 B2 | Page 1 of 1 |
| APPLICATION NO. | : 14/585605 | |
| DATED | : November 29, 2016 | |
| INVENTOR(S) | : Dana Craig Bookbinder et al. | |

It is certified that error appears in the above-identified patent and that said Letters Patent is hereby corrected as shown below:

In the Claims

In Column 18, Line 38, in Claim 19, delete "percent a" and insert -- percent --.

Signed and Sealed this
Twenty-seventh Day of December, 2022

Katherine Kelly Vidal
*Director of the United States Patent and Trademark Office*